(12) United States Patent
Rivera

(10) Patent No.: US 10,842,246 B1
(45) Date of Patent: Nov. 24, 2020

(54) MULTI-UTILITY BEVERAGE HOLDER WITH ELECTRONIC SYSTEMS

(71) Applicant: Fernando Rivera, Bronx, NY (US)

(72) Inventor: Fernando Rivera, Bronx, NY (US)

(*) Notice: Subject to any disclaimer, the term of this patent is extended or adjusted under 35 U.S.C. 154(b) by 0 days.

(21) Appl. No.: 16/507,237

(22) Filed: Jul. 10, 2019

(51) Int. Cl.
| | | |
|---|---|---|
| *A45F 3/18* | (2006.01) | |
| *G06F 3/16* | (2006.01) | |
| *H04R 1/08* | (2006.01) | |
| *H04R 1/02* | (2006.01) | |
| *F21V 33/00* | (2006.01) | |
| *F21V 23/04* | (2006.01) | |
| *F23Q 3/00* | (2006.01) | |

(Continued)

(52) U.S. Cl.
CPC .......... *A45F 3/18* (2013.01); *F21V 23/04* (2013.01); *F21V 33/0004* (2013.01); *F23Q 3/00* (2013.01); *G06F 3/165* (2013.01); *H02J 7/00* (2013.01); *H04R 1/028* (2013.01); *H04R 1/08* (2013.01); *A45F 2003/003* (2013.01); *B62J 11/00* (2013.01); *F21Y 2115/10* (2016.08); *G08B 5/002* (2013.01); *H04R 2420/07* (2013.01)

(58) Field of Classification Search
CPC ........ A45F 3/18; A45F 5/00; A45F 2003/003; A47G 19/025; A47G 19/22; A47G 19/2227; A47G 23/16; B62J 11/00; B65D 1/02; B65D 1/0246; B65D 21/02; B65D 21/0237; B65D 23/12; B65D 43/02; B65D 43/0202; B65D 51/24; B65D 51/245; B65D 85/00; F21V 23/04; F21V 33/00; F21V 33/0004; F23Q 3/00; G06F 3/16; G06F 3/165; G08B 5/00; G08B 5/002; H02J 7/00; H02J 2007/0062; H04R 1/08; H04R 2420/07; H04R 1/028
USPC .................................................... 206/459.1
See application file for complete search history.

(56) References Cited

U.S. PATENT DOCUMENTS

| | | | |
|---|---|---|---|
| 8,123,033 B2 * | 2/2012 | Goldburt | B65D 23/0842 206/459.1 |
| 8,989,673 B2 * | 3/2015 | Sandy | B65D 23/00 206/459.1 |

(Continued)

FOREIGN PATENT DOCUMENTS

| | | | | |
|---|---|---|---|---|
| WO | WO-2017178980 A1 * | 10/2017 | | A61B 5/00 |

*Primary Examiner* — Bryon P Gehman
(74) *Attorney, Agent, or Firm* — Sanchelima & Associates, P.A.; Christian Sanchelima; Jesus Sanchelima

(57) ABSTRACT

The present invention discloses a multi-utility beverage holder comprising a main body made up of molded plastic material. The main body has a top surface and a bottom surface. The main body further includes a top cap provided at top surface and a bottom cap provided at bottom surface. Additionally, the main body is designed to house electronic systems, comprising a network communication system configured to communicate with external devices. The net communication system includes a microprocessor in conjunction with a global positioning system transmitter and network communication system. The network communication system is configured to generate an emergency distress signal played out by an alarm system. The main body further includes power sources including a battery power source and a solar power system for addressing different power requirements. Additionally, the main body comprises a lighter system configured to create a flame to ignite a combustible material.

11 Claims, 2 Drawing Sheets

(51) Int. Cl.
   *H02J 7/00*      (2006.01)
   *G08B 5/00*      (2006.01)
   *B62J 11/00*     (2020.01)
   *A45F 3/00*      (2006.01)
   *F21Y 115/10*    (2016.01)

(56) References Cited

U.S. PATENT DOCUMENTS

| | | | |
|---|---|---|---|
| 9,084,468 B2 * | 7/2015 | Conwell | A45F 5/00 |
| 9,327,960 B2 * | 5/2016 | Sweeney | B65D 51/24 |
| 9,376,235 B2 * | 6/2016 | Goldburt | B65D 23/14 |
| 10,161,782 B2 * | 12/2018 | Saltzgiver | G01F 23/263 |
| 10,213,032 B1 * | 2/2019 | Fontaine-Cole | B65D 81/3869 |
| 10,329,061 B2 * | 6/2019 | Dias | A47G 19/025 |
| 10,613,816 B2 * | 4/2020 | Bielawski | A47G 19/2227 |
| 2008/0060479 A1 * | 3/2008 | Nelson | B67B 7/16 |
| | | | 220/737 |
| 2010/0300913 A1 * | 12/2010 | Goldburt | B65D 81/36 |
| | | | 206/459.1 |
| 2015/0108026 A1 * | 4/2015 | Azimi | G06F 19/3475 |
| | | | 206/459.1 |
| 2015/0335183 A1 * | 11/2015 | Balachandran | A47G 19/2227 |
| | | | 206/459.1 |
| 2020/0029709 A1 * | 1/2020 | Felder | B65D 53/02 |

* cited by examiner

MULTI-UTILITY BEVERAGE HOLDER WITH ELECTRONIC SYSTEMS

BACKGROUND OF THE INVENTION

1. Field of the Invention

The present invention relates to a multi-utility beverage holder. More particularly, present invention relates to a multi-utility beverage holder with integrated electronics.

2. Description of the Related Art

In day-to-day life, working people such as people who travel often, people who go to the gym, or sports persons such as hikers, cyclists, athletes, campers, parents, and military personnel as well, need a variety of devices such as mobile chargers, GPS devices, battery power sources, activity and biometric trackers, and the like. So, they are required to carry such electronic devices with them. Several designs for integrating such devices have been designed in the past. None of them, however, includes a design that provides users all-in-one kit that is also a utility object.

Applicant believes that a related reference corresponds to United States Patent Application 2017/0245624 issued to Cezar Neves discloses a water bottle comprising a smartphone holder, integral phone charging battery, and a Bluetooth speaker. However, the above references differ from the present invention because the present invention discloses a multi-utility beverage holder with integrated electronics that can be used as an entertainment device and an emergency life saving device as well. The present invention addresses these issues by providing a multi-utility beverage holder that includes an emergency panic button that may automatically call for help in the event of an emergency.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a multi-utility beverage holder and avoid the drawbacks of the prior art.

It is an object of present invention to provide a multi-utility beverage holder, comprising a main body made up of molded plastic material. Main body has a top surface, a bottom surface, and an opening. Main body has a top cap provided at top surface and bottom cap provided at bottom surface, wherein the main body is designed to house electronic systems.

It is another object of the present invention to provide electronic systems comprising a network communication system configured to communicate with external devices, a microprocessor, in conjunction with a global positioning system transmitter and a network communication system configured to generate an emergency distress signal played out by an alarm system thereby providing a user with an extra safety precaution.

It is yet another object of the present invention to provide power sources including a battery power source and a solar power system for addressing different power requirements to provide a user with an external power supply to charge electronic devices.

Further objects of invention will be brought out in following part of specification, wherein detailed description is for purpose of fully disclosing invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one of ordinary skill in the art will understand that variations can be substituted that are within the scope of the invention as described.

The present disclosure discloses a multi-utility beverage holder, comprising a main body made up of molded plastic material, main body having a top surface, a bottom surface, and an opening. Main body has a top cap provided at top surface and a bottom cap provided at bottom surface, wherein main body is designed to house electronic systems. Electronic systems comprises at least a network communication system configured to communicate with external devices, a microprocessor, in conjunction with a global positioning system transmitter and network communication system, configured to generate an emergency distress signal played out by an alarm system, power sources including a battery power source and a solar power system for addressing different power requirements, and a lighter system configured to create a flame and ignite a combustible material.

Figure 1:
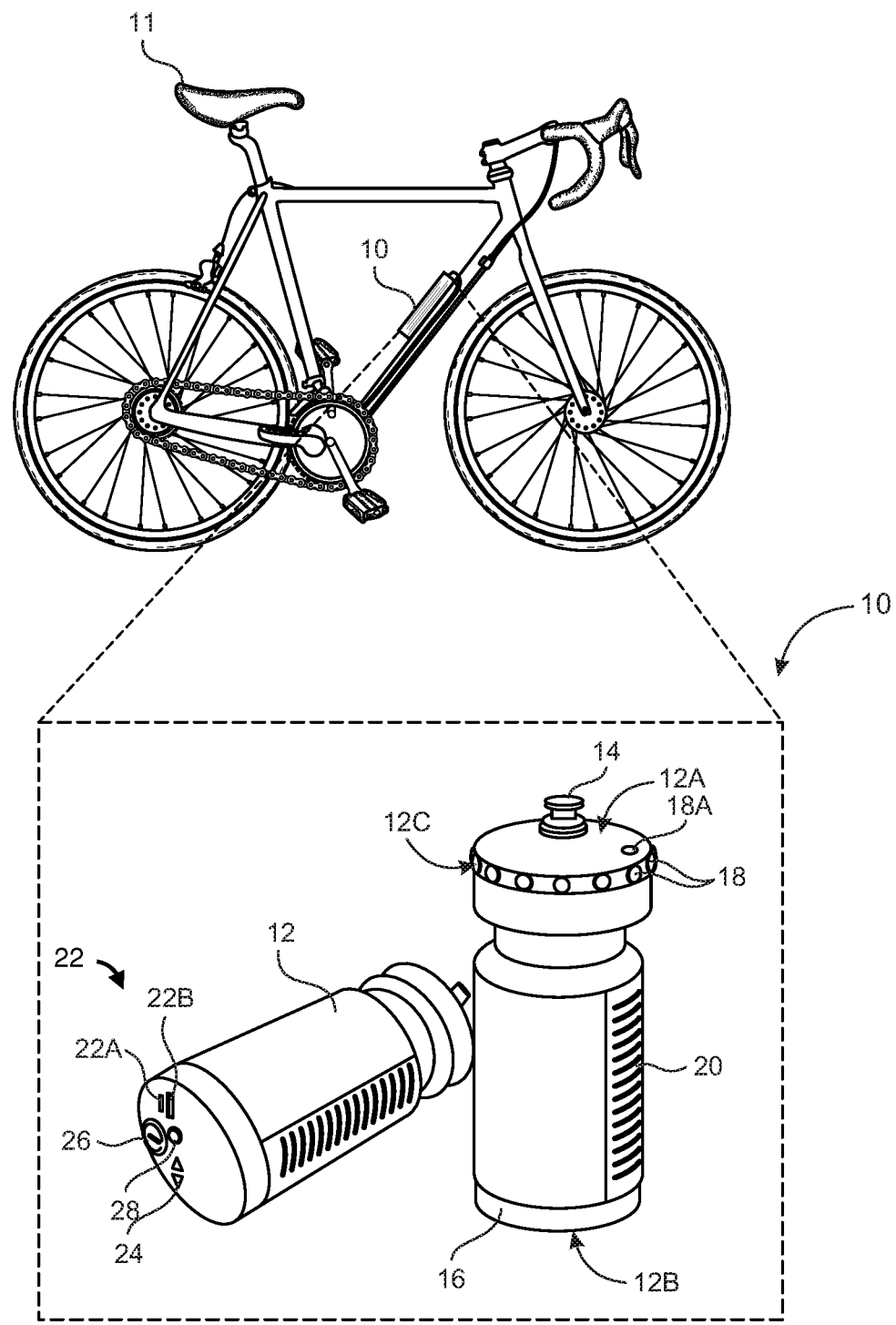
FIG. 1 represents an exemplary multi-utility beverage holder 10 of present invention, according to various embodiments described herein.
Figure 2:
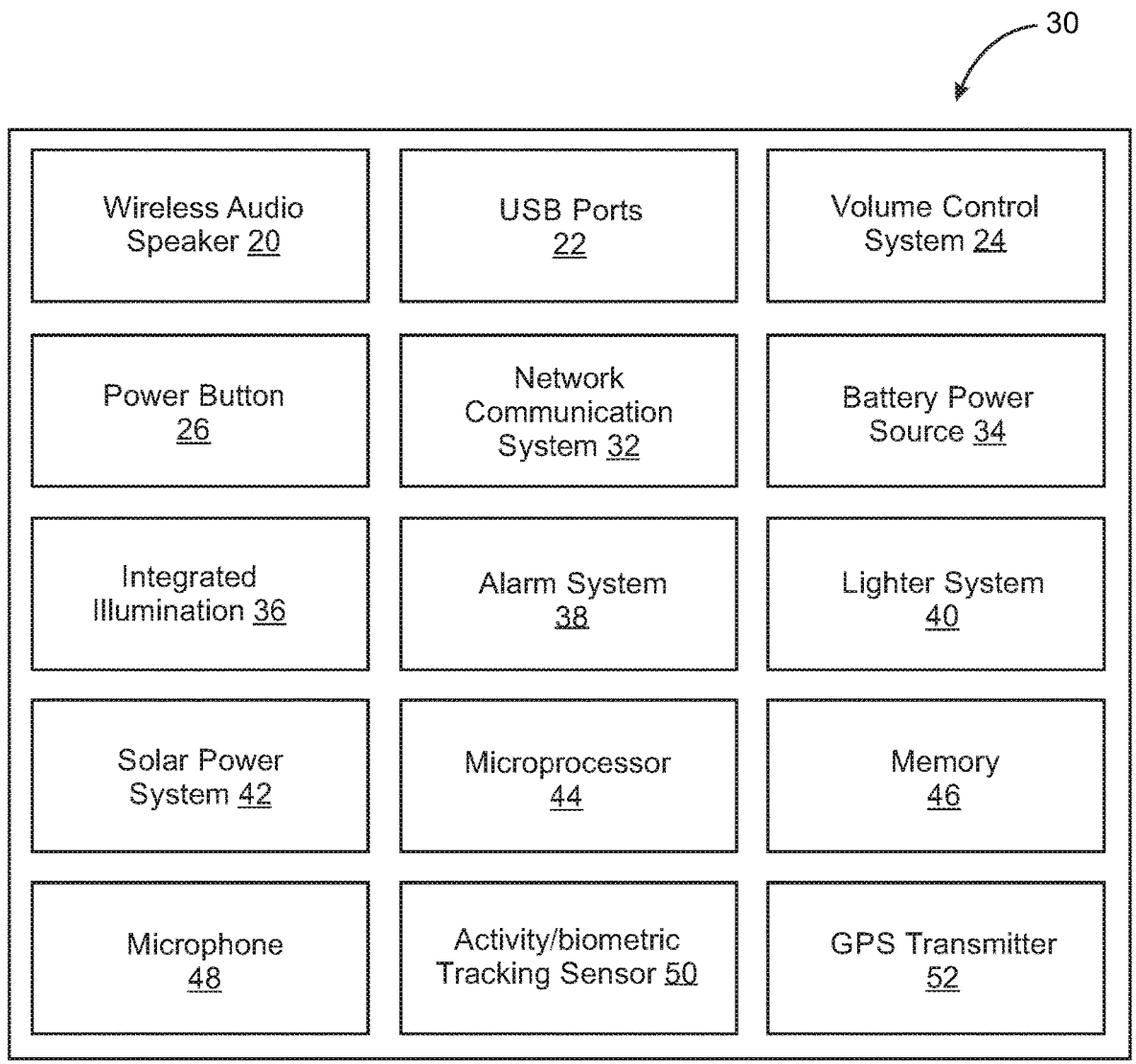
FIG. 2 represents a block diagram 30 of exemplary multi-utility beverage holder 10 of present invention, according to various embodiments described herein.

Various features and embodiments of a multi-utility beverage holder are explained in conjunction with the description of FIGS. 1 and 2.

FIG. 1 represents an exemplary multi-utility beverage holder 10 of present invention, according to various embodiments described herein. As illustrated, multi-utility beverage holder 10 may be housed in, for example, a bicycle 11. Multi-utility beverage holder 10 may comprise a main body 12. Main body 12 may be made up of molded plastic material covered by a rubber grip. Rubber grip may be primarily a molded elastic material, such as molded rubber, that may be resilient enough to be stretched to receive main body 12 of multi-utility beverage holder 10 and return back to its original shape once main body 12 of multi-utility beverage holder 10 is fitted within. Main body 12 may have a top surface 12A, a bottom surface 12B, and an opening 12C. Top surface 12A of main body 12 may have a top cap 14 that may be a ¼ turn tethered cap, for example. Top surface 12A may house light sources 18 configured to illuminate during dark and to be used as a distress beacon, and switched on/off by LED power button 18A. Further, bottom surface 12B of main body 12 may be provided with a water-resistant bottom cap 16.

Main body 12 may be designed to house various external electronic systems, for example, a wireless audio speaker 20, USB ports 22 such as a Universal Serial Bus (USB) type C 22A and a USB port 22B. Main body 12 further houses a volume control system 24, a power button 26, and an optional panic button 28. Such external electronic systems are described in FIG. 2. Additional internal electronic systems are illustrated and described in FIG. 2. Exemplary height of multi-utility beverage holder 10 may be 8 inches-10 inches, and exemplary width may be 4 inches. Rubber grip that covers molded plastic material of main body 12 of multi-utility beverage holder 10 may facilitate an easy grip to provide holding comfort and security.

Multi-utility beverage holder 10 may be a very beneficial product as it ensures that a supply of water, sports drink or other such beverage is readily available to user. Multi-utility beverage holder 10 may also provide an effective way to signal for help in case of an event of emergency. Light sources 18 are provided for added visibility and safety. Multi-utility beverage holder 10 is very convenient and easy to use. Multi-utility beverage holder 10 has got innovative and versatile design. Multi-utility beverage holder 10 is ideal for fitness and outdoor enthusiasts.

FIG. 2 represents a block diagram 30 of exemplary multi-utility beverage holder 10 of present invention, according to various embodiments described herein. As illustrated, multi-utility beverage holder 10 may comprise wireless audio speaker 20, USB ports 22, volume control system 24, power button 26, a network communication system 32, power sources including a battery power source 34, an integrated illumination 36, an alarm system 38, a lighter system 40, a solar power system 42, a microprocessor 44, a memory 46, a microphone 48, an activity/biometric tracking sensor 50, and a global positioning system transmitter 52.

Wireless audio speaker 20 may be configured to generate audio signals. Wireless audio speaker 20 may be an electroacoustic transducer that converts an electrical audio signal into a corresponding sound signal, that is rendered for user of multi-utility beverage holder 10.

USB ports 22 may be configured to provide connection interfaces for external devices. For example, USB ports 22 may provide support to all USB ports for all cell phones and charging the battery. USB ports 22 may include USB type C 22A for input and USB port 22B for output.

Volume control system 24 may be configured to control volume of a wireless audio speaker 20.

Power button 26 may be configured to switch on or off the electronic systems of multi-utility beverage holder 10.

Optional panic button 28 may be manually triggered by user in case of any panic situation, for example in case of an accident when user is still in conscious state or user is not feeling well.

Network communication system 32 may be configured to communicate, for example via Bluetooth network, ad-hoc network, 3G, or 4G communication protocols, with external devices, such as smart device of user or other users. Network communication system 32 may enable multi-utility beverage holder 10 to wirelessly pair and sync with multiple external devices, for example, mobile devices or other multi-utility beverage holders associated with other users. For example, if a group of bikers is riding in a group, each biker having its own multi-utility beverage holder 10, same music may be played to help group push harder once multi-utility beverage holder 10 is paired and synched with other multi-utility beverage holders associated with other users. Network communication system 32 may also facilitate its user to connect to social networking sites via long-range communication network. In accordance with an embodiment, network communication system 32 may also facilitate its user to store corresponding data, such as activity and biometric data, determined by activity/biometric tracking sensor 50.

Power sources including a battery power source 34 and a solar power system 42 may be configured to address different power requirements. For example, battery power source 34 may receive power from a Lithium-based battery pack. On the other hand, solar power system 42 may be configured to generate power from solar energy and may be highly useful for hikers, campers or suburban moms.

Integrated illumination 36 may further comprise light sources 18 configured to illuminate during dark or during emergency situation. Light sources 18 may be light emitting diodes (LEDs) that may generate close to 1800 Lumens of light energy as a flash light when emergency distress signal is generated.

Alarm system 38 may be configured to generate an alarm, such as an emergency distress signal siren, based on instructions received from microprocessor 44. Emergency distress signal may be further indicated by, for example 1800 Lumens LED lights that can be seen during night time. In accordance with an embodiment, emergency distress signal may be sent directly to an emergency contact of user via an app, and in absence of any response, an emergency number, such as 911, may be automatically dialed and exact location of user of multi-utility beverage holder 10 may be provided.

Lighter system 40 may be configured to create a flame to ignite a combustible material. Lighter system 40 may be useful for hikers and campers that may require to create a firewood during their expedition.

Microprocessor 44 may include a processing unit that may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a coprocessor, and/or other processors or integrated circuits. In accordance with an embodiment, microprocessor 44, in conjunction with global positioning system transmitter 52 and network communication system 32, may be configured to generate an emergency distress signal played out by alarm system 38.

Memory 46 may be configured to buffer music files, GPS locations, activities, and biometric parameters of a user of multi-utility beverage holder 10 during a course of time.

Microphone 48 may be configured to receive voice signals from a user of multi-utility beverage holder 10. Using microphone 48, user may communicate with other external devices.

Activity/biometric tracking sensor 50 may be configured to track current activities and biometric parameters of a user handling multi-utility beverage holder 10. Various examples of such parameters may include heart rate, blood pressure, distance ran by user (an athlete), distance yet to be covered, how much time left to run, and the like. Such parameters may be communicated to user via wireless audio speakers 20.

Global positioning system transmitter 52 may be configured to provide current geographical location of user of multi-utility beverage holder 10, to microprocessor 44. Microprocessor 44 may use current geographical location of user of multi-utility beverage holder 10, determined by global positioning system transmitter 52, in case when emergency distress signal is generated.

Proposed multi-utility beverage holder 10 may be not just a normal liquid beverage container, but is also an emergency survival companion that may have a corresponding app and many survival features that may save a life by seconds or minutes. Multi-utility beverage holder 10 may be highly useful for fitness enthusiasts as it provides an effective way to increase safety and stay hydrated. Multi-utility beverage holder 10 may hold water or a sports drink with additional electronic systems, as described in FIG. 1 and FIG. 2.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multi-utility beverage holder system, comprising:
a main body made of molded plastic material, said main body having a top surface, a bottom surface, and an opening, wherein said main body has a top cap provided at said top surface and a bottom cap provided at said bottom surface, wherein said main body house electronic systems, wherein said electronic systems comprise a network communication system configured to communicate with external devices, wherein said opening is located along an outer surface of a top end of said main body, wherein said opening houses a plurality of light sources along a circumference of said top cap, wherein said plurality of light sources are a distress beacon adapted to illuminate in a nighttime environment, wherein said plurality of light sources are light emitting diodes with a circular shape which generate 1800 lumens of light energy, an alarm system which generates an emergency distress signal siren in the event of an emergency; and
a microprocessor, in conjunction with a global positioning system transmitter and said network communication system, power sources including a battery power source and a solar power system for addressing different power requirements, and a lighter system configured to create a flame to ignite a combustible material.

2. The multi-utility beverage holder system according to claim 1, further comprising Universal Serial Bus (USB) ports including a USB type C port and a USB port configured to provide connection interfaces for external devices.

3. The multi-utility beverage holder system according to claim 1, further comprising a wireless audio speaker configured to generate audio signals.

4. The multi-utility beverage holder system according to claim 1, further comprising a biometric tracking sensor configured to track current activities and biometric parameters of a user handling said multi-utility beverage holder system.

5. The multi-utility beverage holder system according to claim 1, further comprising a volume control system to control volume of a wireless audio speaker.

6. The multi-utility beverage holder system according to claim 1, further comprising a memory configured to buffer at least music files, GPS locations, activities, and biometric parameters of a user of said multi-utility beverage holder system.

7. The multi-utility beverage holder system according to claim 1, further comprising a microphone configured to receive voice signals from a user of said multi-utility beverage holder system.

8. The multi-utility beverage holder system according to claim 1, further comprising a power button configured to switch on or switch off said multi-utility beverage holder system.

9. The multi-utility beverage holder system according to claim 1, wherein said network communication system is further configured to pair and sync said multi-utility beverage holder system with other multi-utility beverage holder systems associated with other users.

10. The multi-utility beverage holder system according to claim 1, wherein said bottom cap further includes a power button.

11. The multi-utility beverage holder system according to claim 1, wherein said bottom cap further includes a panic button.

\* \* \* \* \*